(12) United States Patent
Nakatani et al.

(10) Patent No.: US 6,834,496 B2
(45) Date of Patent: Dec. 28, 2004

(54) EXHAUST GAS PURIFYING APPARATUS FOR INTERNAL COMBUSTION ENGINE AND CONTROL METHOD THEREOF

(75) Inventors: Koichiro Nakatani, Susono (JP); Toshiaki Tanaka, Numazu (JP); Shinya Hirota, Susono (JP); Takamitsu Asanuma, Susono (JP); Shunsuke Toshioka, Numazu (JP); Koichi Kimura, Susono (JP); Akira Mikami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/259,894

(22) Filed: Sep. 30, 2002

(65) Prior Publication Data

US 2003/0061802 A1 Apr. 3, 2003

(30) Foreign Application Priority Data

Oct. 1, 2001 (JP) ....................................... 2001-305424

(51) Int. Cl.[7] ................................................. F01N 3/00
(52) U.S. Cl. ............................. 60/274; 60/286; 60/287; 60/292; 60/295; 60/303; 60/324
(58) Field of Search .......................... 60/274, 280, 284, 60/286, 287, 288, 289, 292, 295, 297, 300, 303, 324

(56) References Cited

U.S. PATENT DOCUMENTS

| | | | |
|---|---|---|---|
| 5,406,790 A | * | 4/1995 | Hirota et al. .................. 60/276 |
| 5,657,625 A | | 8/1997 | Koga et al. |
| 5,910,097 A | * | 6/1999 | Boegner et al. ............... 60/278 |
| 5,974,791 A | * | 11/1999 | Hirota et al. .................. 60/276 |
| 6,409,973 B1 | * | 6/2002 | Kinugasa et al. ........... 422/171 |
| 6,502,391 B1 | * | 1/2003 | Hirota et al. .................. 60/288 |

FOREIGN PATENT DOCUMENTS

| | | | | |
|---|---|---|---|---|
| EP | 0 562 805 A | | 9/1993 | |
| EP | 1 055 806 A | | 5/2000 | |
| EP | 001055806 A2 | * | 11/2000 | .................. 60/286 |
| JP | U-1-124021 | | 8/1989 | |
| JP | A-2001-82131 | | 3/1991 | |
| JP | B2 2727906 | | 12/1997 | |
| JP | 11 093641 | | 4/1999 | |
| JP | 2001-303980 | | 10/2001 | |

* cited by examiner

Primary Examiner—Binh Q. Tran
(74) Attorney, Agent, or Firm—Oliff & Berridge, PLC

(57) ABSTRACT

An exhaust gas purifying apparatus for an internal combustion engine includes plural catalysts provided in parallel. In a case where temperatures of the catalysts need to be raised, a catalyst is selected from among the catalysts and the exhaust gas is allowed to flow in the selected catalyst. In addition, the temperature of the selected catalyst is raised without using a reducing agent when the temperatures of the catalysts are lower than a temperature range in which the reducing agent can be purified. Alternatively, the reducing agent is supplied to the selected catalyst so as to raise the temperature thereof when the temperatures of the catalysts are equal to or higher than the temperature at which the reducing agent can be purified.

12 Claims, 6 Drawing Sheets

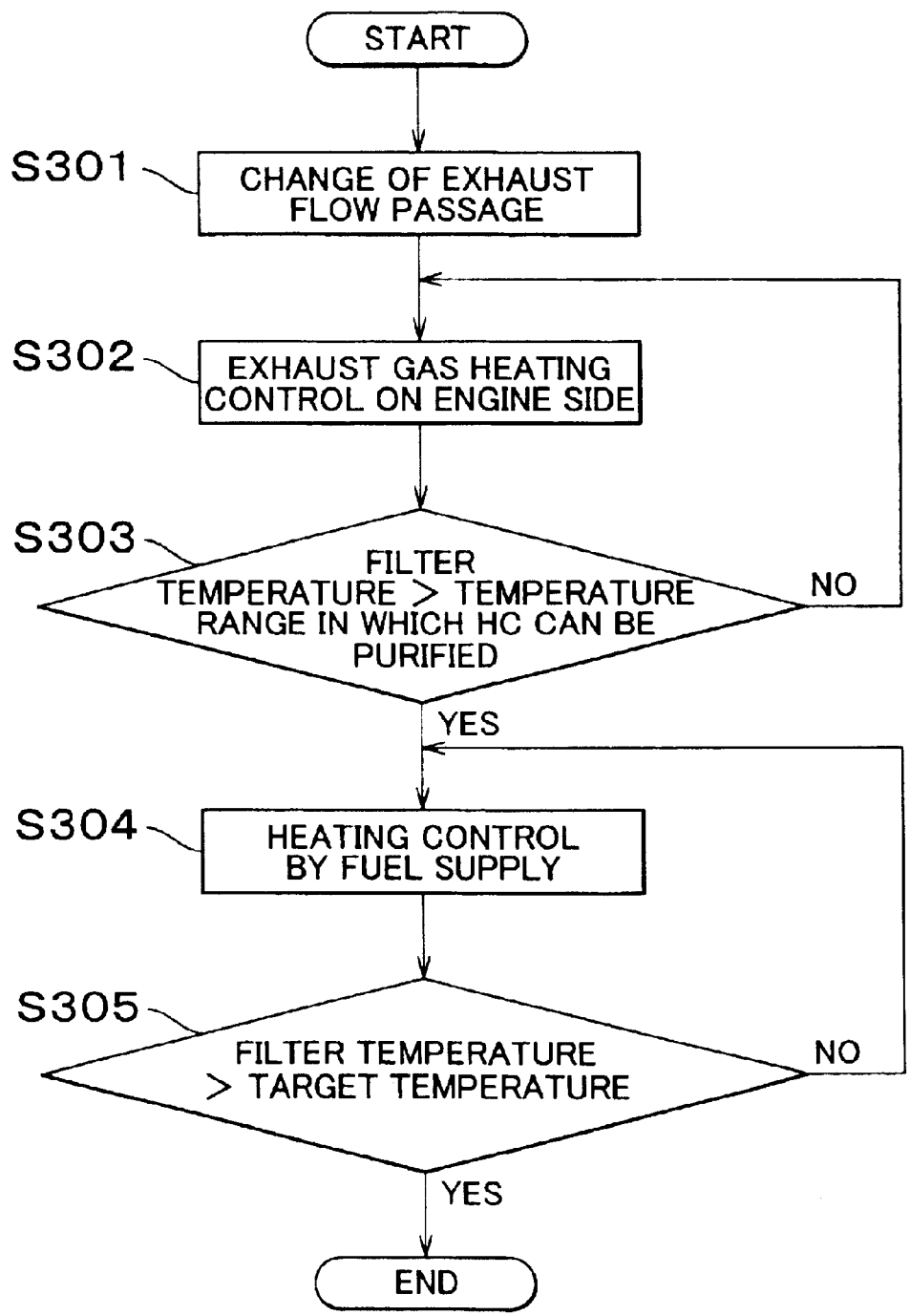

EXHAUST GAS PURIFYING APPARATUS FOR INTERNAL COMBUSTION ENGINE AND CONTROL METHOD THEREOF

INCORPORATION BY REFERENCE

The disclosure of Japanese Patent Application No. 2001-305424 filed on Oct. 1, 2001 including the specification, drawings and abstract is incorporated herein by reference in its entirety.

BACKGROUND OF THE INVENTION

1. Field of the Invention

The invention relates to an exhaust gas purifying apparatus for an internal combustion engine and a control method thereof.

2. Description of the Related Art

As an exhaust gas purifying apparatus for purifying an exhaust gas in an internal combustion engine, there is known an art in which plural catalysts for purifying the exhaust gas are arranged in parallel in exhaust passages. In such an exhaust gas purifying apparatus for an internal combustion engine, catalysts having an oxidation function such as nitrogen oxides (NOx) catalysts may be arranged in parallel.

The NOx catalyst can purify the exhaust gas discharged from an internal combustion engine such as a diesel engine and a lean burn gasoline engine that can operate in a lean burn state. The NOx catalyst includes, for example, a selective reduction type NOx catalyst and an occlusion-reduction type NOx catalyst.

The occlusion-reduction type NOx catalyst performs an absorbing and emitting operation. That is, the occlusion-reducion type NOx catalyst absorbs nitrogen oxides (NOx) when an oxygen concentration of the inflowing exhaust gas is high, and emits the absorbed NOx and reduces the NOx into nitrogen ($N_2$) when the oxygen concentration of the inflowing exhaust gas is low.

In the case of the occlusion-reduction type NOx catalyst, an air-fuel ratio of the exhaust gas in the internal combustion engine is lean during a normal operation, so that the NOx in the exhaust gas is absorbed in the NOx catalyst. However, if the exhaust gas at a lean air-fuel ratio continues to be supplied to the NOx catalyst, the amount of the NOx absorbed in the NOx catalyst reaches a saturation amount, and as a result, the catalyst cannot absorb the NOx any further and the NOx passes through the catalyst. Thus, it is required that, in the NOx catalyst, the oxygen concentration of the exhaust gas should be decreased at predetermined timing before the amount of the NOx absorbed in the NOx catalyst reaches a saturation amount, and a component amount of hydrogen carbide (HC) in the exhaust gas should be increased, thereby emitting the NOx absorbed in the NOx catalyst and reducing the NOx into nitrogen ($N_2$) in order to recover the NOx absorbing ability of the NOx catalyst.

Thus, in the exhaust gas purifying apparatus using a lean NOx catalyst, the oxygen concentration of the exhaust gas needs to be decreased intermittently for purifying the NOx. As an example of a method of decreasing the oxygen concentration of the exhaust gas intermittently, a fuel supply into the exhaust gas can be adopted.

Sulfur oxides (SOx) produced by burning of a sulfur component, which is contained in the fuel, is also absorbed in the occlusion-reduction type NOx catalyst according to the same mechanism as in the case of NOx. The SOx thus absorbed in the catalyst is not easily emitted as compared to NOx, and is accumulated in the NOx catalyst. This is called sulfur poisoning (SOx poisoning). In the SOx poisoning, NOx purification efficiency is lowered. Therefore, a process for recovering the catalyst from the SOx poisoning (SOx poisoning recovery process) needs to be performed at appropriate timing. The SOx poisoning recovery process is performed by setting the NOx catalyst at a high temperature (600 to 650 degrees, for example) while passing the exhaust gas with a reduced low oxygen concentration in the NOx catalyst.

However, since the temperature of the exhaust gas is low during the lean burn operation of the engine, it is difficult to raise the temperature of the catalyst to a temperature range in which the catalyst can be recovered from the SOx poisoning.

In order to solve such a problem, for example, Japanese Patent No. 2727906 discloses an exhaust gas purifying apparatus for an internal combustion engine in which two particulate filters supporting an NOx absorbent are arranged in parallel in an exhaust passage. In the device, the exhaust gas flowing into the NOx absorbent of either one of the particular filters is blocked, i.e., the particular filters are blocked one by one, so that the NOx is emitted from the blocked NOx absorbent. According to the exhaust gas purifying apparatus for an internal combustion engine, when one of the NOx absorbents is performing a regeneration operation, the internal engine can be operated by passing the exhaust gas through the other of the NOx absorbents. Thus, a total flow of the exhaust gas does not need to be reduced and an output of the internal combustion engine does not decrease. Therefore, the regeneration operation of the NOx absorbent can be performed at appropriate timing irrespective of the operation condition of the engine. Furthermore, it is possible to raise the temperature of the filter up to a temperature required for recovery from the SOx poisoning by burning the particulates when the reducing agent is supplied.

Each catalyst has its temperature range in which the exhaust gas is effectively purified (temperature window). Thus, it is important to raise the temperature to each temperature window as quickly as possible.

In the device disclosed in Japanese Patent No. 2727906, almost no exhaust gas flows in the NOx absorbent when the reducing agent is supplied, so that the NOx absorbent can hardly obtain energy from the exhaust gas. At this time, if the NOx absorbent can obtain much energy from the exhaust gas, the temperature of the NOx absorbent can be raised promptly.

Meanwhile, if the temperature of the NOx absorbent is raised by raising the temperature of the exhaust gas, smoke or deterioration of the operation state of the engine may occur. In addition, if the temperature of the NOx absorbent is raised by supplying the reducing agent into the exhaust gas, the oxygen may be insufficient depending on the supplying amount of the reducing agent. In this case, a part of the reducing agent cannot be oxidized, and accordingly, the temperature cannot be raised sufficiently.

Above-mentioned heating control for the catalyst (heating control) is performed also in the case where the particulates accumulated in the NOx absorbent are oxidized, and the temperature of the catalyst needs to be raised promptly.

SUMMARY OF THE INVENTION

The invention is made in order to solve the above-mentioned problem. Accordingly, an object of the invention is to provide an art for raising the temperature of plural catalysts promptly in an exhaust gas purifying apparatus for an internal combustion engine including the plural catalysts having an oxidation function.

According to a first aspect of the invention, an exhaust gas purifying apparatus for an internal combustion engine includes plural exhaust passages of the internal combustion engine which are provided in parallel, catalysts (a first catalyst and a second catalyst) which have an oxidation function and are provided in the plural exhaust passages respectively, a reducing agent supply device that supplys a reducing agent to the catalysts, a catalyst heating device that raises temperatures of the catalysts independently of the reducing agent supply device, a flow amount adjusting device that adjusts an amount of the exhaust gas flowing in the exhaust passages, and a temperature estimating device that estimates the temperatures of the catalysts. Further, the exhaust gas purifying apparatus for an internal combustion engine according to the first aspect of the invention includes a control device. In a case where the temperatures of the catalysts need to be raised, the control device selects a catalyst (the first catalyst) in which the exhaust gas flows, and allows a larger amount of the exhaust gas to flow in the selected catalyst than in the other catalysts (e.g. the second catalyst) by the flow amount adjusting device. In addition, the control device raises the temperature of the selected catalyst by the catalyst heating device when the temperatures of the catalysts are lower than a temperature range in which the reducing agent can be purified, and supplies the reducing agent to the selected catalyst to raise the temperature of the selected catalyst by the reducing agent supply device when the temperatures of the catalysts are in the temperature range in which the reducing agent can be purified.

According to the first aspect of the invention, energy of the exhaust gas can be concentrated on the selected catalyst (the first catalyst) and the purification efficiency can be increased in a short time by allowing the exhaust gas to flow in only the selected catalyst. In addition, the selected catalyst can be heated promptly and then the other catalysts (e.g. the second catalyst) can be heated easily.

According to the first aspect, the exhaust gas is allowed to flow in the selected catalyst by the flow amount adjusting device, the temperature of the selected catalyst is raised by the catalyst heating device when the temperature of the catalysts is lower than the temperature range in which the reducing agent can be purified. In this case, the catalyst heating device raises the temperature of the exhaust gas, for example. When the temperature of the catalysts reaches the temperature range in which the reducing agent can be purified, the reducing agent is supplied to the selected catalyst by the reducing agent supply device for heating the selected catalyst to a required temperature (temperature at which the NOx can be purified, for example). Accordingly, the selected catalyst can be promptly heated.

The temperature estimating device may measure the temperature of the catalyst directly or estimate the temperature of the catalyst by measuring the temperature of the exhaust gas upstream of the catalyst.

According to the first aspect, the control device may allow all the exhaust gas to flow in the selected catalyst and cut off the flow of the exhaust gas into the catalysts which are not selected.

In addition, according to the first aspect, when the temperature of the selected catalyst is raised to a temperature range in which nitrogen oxides can be purified, a new catalyst may be selected from the catalysts that have not been selected so that the exhaust gas flows in the newly selected catalyst. By heating the catalysts in turn as mentioned above, at least one of the catalysts can be promptly activated.

Further, according to the first aspect, the catalysts may be supported on a particulate filter that can temporarily trap particulate matters in the exhaust gas and when the temperature of the selected catalyst is heated to a temperature range in which the particulate matter can be removed, a new catalyst may be selected from the catalysts that have not been selected so that the exhaust gas flows in the newly selected catalyst. By heating the catalysts in turn as mentioned above, at least one of the catalysts can be promptly activated to the temperature range in which the particulate matter can be removed.

Furthermore, according to the first aspect, the amount of the exhaust gas flowing in the catalysts which are not selected may be increased if a pressure of the exhaust gas upstream of the catalysts is equal to or greater than a predetermined value.

The exhaust gas flows in all the catalysts during a normal operation of the engine, so that a capacity of each catalyst can be made small. However, in the exhaust gas purifying apparatus for an internal combustion engine, if the exhaust gas is concentrated to flow in the selected catalyst, an amount of the generated exhaust gas becomes greater than the amount of the exhaust gas which can flow in the catalyst. As a result, the pressure of the exhaust gas upstream of the catalysts may be increased. Therefore, in this case, the pressure of the exhaust gas upstream of the catalysts can be decreased by allowing the exhaust gas to flow in the other catalysts.

According to a second aspect of the invention, an exhaust gas purifying apparatus for an internal combustion engine includes a NOx catalyst which have an oxidation function and are provided in an exhaust passage of internal combustion engine, a reducing agent supply device that supplies a reducing agent to the NOx catalyst, an NOx catalyst heating device that raises a temperature of the NOx catalyst independently of the reducing agent supply device, a flow amount adjusting device that adjusts an amount of the exhaust gas flowing in the exhaust passage, and a temperature estimating device that estimates the temperature of the NOx catalyst. Further, according to the second aspect of the invention, when the temperature of the NOx catalyst are lower than a temperature range in which the reducing agent can be purified, the flow amount adjusting device allows a larger amount of exhaust gas to flow in the NOx catalyst than when the NOx is reduced in the NOx catalyst, and the NOx catalyst heating device raises the temperature of the NOx catalyst When the temperatures of the NOx catalyst are in the temperature range in which the reducing agent can be purified, the reducing agent supply device supplies the reducing agent so that an air-fuel ratio of the exhaust gas becomes greater than a stoichiometric air-fuel ratio to raise the temperature of the NOx catalyst.

According to the second aspect of the invention, the NOx catalyst to be heated can be brought into a state appropriate for being heated by allowing a larger amount of the exhaust gas to flow in the NOx catalyst than when the NOx is reduced, and making the air-fuel ratio of the exhaust gas flowing in the NOx catalyst slightly larger than the stoichiometric air-fuel ratio.

In view of prevention of deterioration of fuel consumption when the NOx is emitted from the NOx catalyst, it is preferable that the amount of the exhaust gas flowing in the NOx catalyst be decreased and further the air-fuel ratio of the exhaust gas be made smaller than the stoichiometric air-fuel ratio. On the other hand, in view of prompt heating of the NOx catalyst, it is preferable that the exhaust gas flowing in the NOx catalyst be increased and further the air-fuel ratio of the exhaust gas be made larger than the stoichiometric air-fuel ratio.

According to the second aspect of the invention, it is possible to heat the NOx catalyst promptly by giving priority to the heating of the NOx catalyst.

The temperature estimating device may measure the temperature of the catalyst directly or estimate the temperature of the catalyst by measuring the temperature of the exhaust gas upstream of the catalyst.

According to a third aspect of the invention, in a control method of an internal combustion engine, in a case where the temperatures of the catalysts need to be raised, a catalyst (a first catalyst) in which an exhaust gas flows is selected and a larger amount of the exhaust gas is allowed to flow in the selected catalyst than in the other catalysts (e.g. a second catalyst). In addition, when the temperatures of the catalysts are lower than a temperature range in which a reducing agent can be purified, the temperature of the selected catalyst is raised. When the temperatures of the catalysts are in the temperature range in which the reducing agent can be purified, the reducing agent is supplied to the selected catalyst so as to raise the temperature thereof.

According to the third aspect, the energy of the exhaust gas can be concentrated on the selected catalyst (the first catalyst) and the purification efficiency can be increased in a short time by allowing the exhaust gas to flow in only the selected catalyst. In addition, the selected catalyst can be heated promptly and then the other catalysts (e.g. the second catalyst) can be heated easily.

According to a fourth aspect of the invention, in a method for purifying an exhaust gas of an internal combustion engine, when the temperature of the NOx catalyst are lower than a temperature range in which the reducing agent can be purified, a larger amount of the exhaust gas is allowed to flow in the NOx catalyst than when the NOx is oxidized in the NOx catalyst so as to raise the temperature of the NOx catalyst. When the temperature of the catalyst are in the temperature range in which the reducing agent can be purified, the reducing agent is supplied so that the air-fuel ratio of the exhaust gas becomes larger than the stoichiometric air-fuel ratio, thereby raising the temperature of the NOx catalyst.

According to the fourth aspect of the invention, the NOx catalyst to be heated can be brought into a state appropriate for being heated by allowing a larger amount of the exhaust gas to flow in the NOx catalyst than when the NOx is reduced, and making the air-fuel ratio of the exhaust gas flowing in the NOx catalyst slightly greater than the stoichiometric air-fuel ratio.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a flow chart showing a flow of a filter heating control according to a third embodiment of the invention.

DETAILED DESCRIPTION OF PREFERRED EMBODIMENTS

Hereinafter, an exhaust gas purifying apparatus for an internal combustion engine according to embodiments of the invention will be described with reference to the accompanying drawings. In the embodiments, the exhaust gas purifying apparatus for an internal combustion engine according to the invention is applied to a diesel engine for driving a vehicle.

(First Embodiment)

Figure 1:
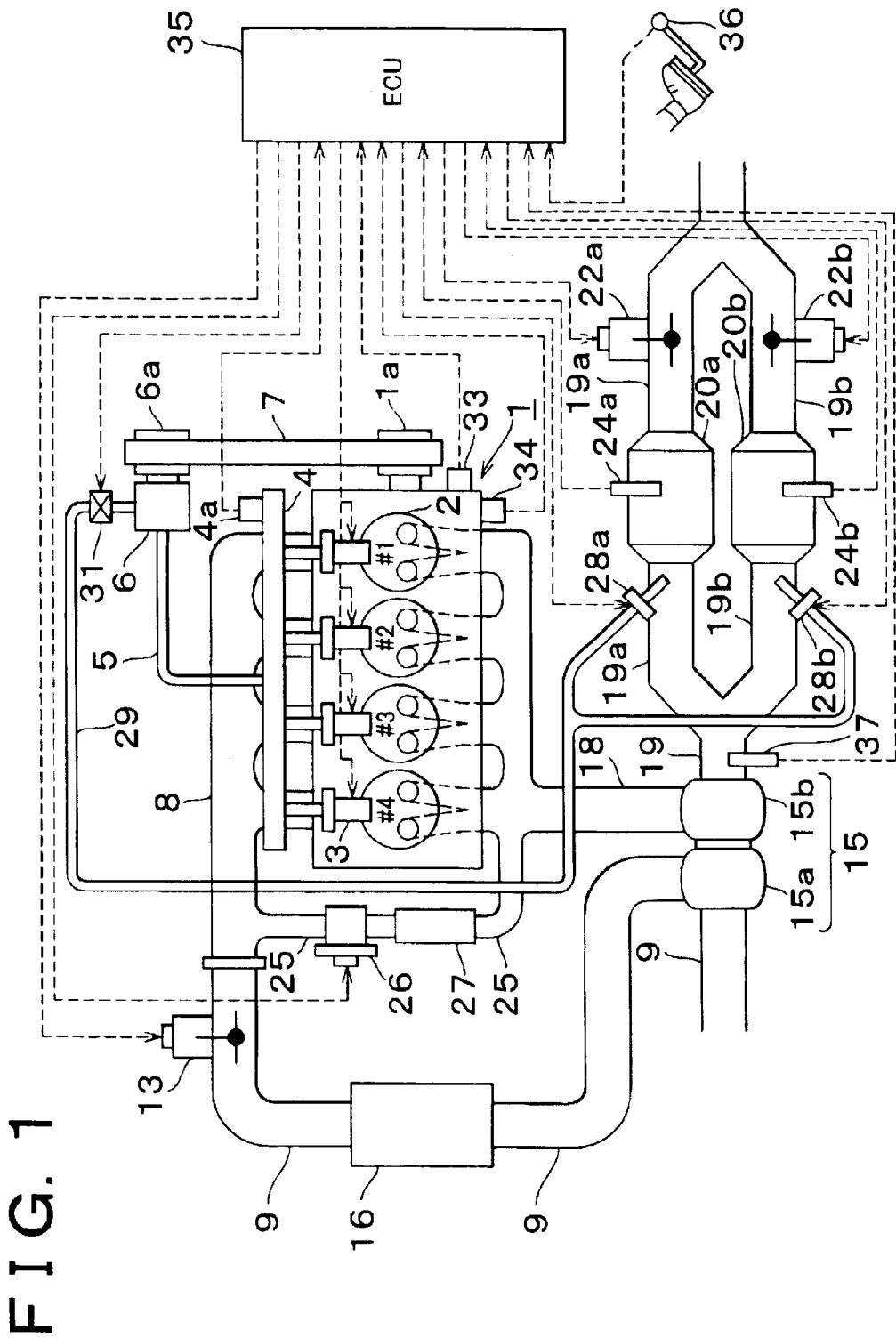
FIG. 1 is a view showing a schematic structure of an engine to which an exhaust gas purifying apparatus for an internal combustion engine according to an embodiment of the invention is applied and an intake and exhaust system thereof.

FIG. 1 shows a schematic structure of an engine 1 to which an exhaust gas purifying apparatus for an internal combustion engine according to the invention is applied, and an intake and exhaust system thereof.

The engine 1 shown in FIG. 1 is a water-cooled 4-cycle diesel engine having four cylinders 2.

The engine 1 includes fuel infection valves 3 for injecting a fuel directly into combustion chambers of the respective cylinders 2. Each fuel injection valve 3 is connected to each accumulator (common rail) 4 for accumulating the fuel to a predetermined pressure. The common rail 4 is provided with a common rail pressure sensor 4a for outputting an electrical signal in response to the fuel pressure in the common rail 4.

The common rail 4 communicates with a fuel pump 6 via a fuel supply pipe 5. The fuel pump 6 is operated by a rotation torque of an output shaft (crankshaft) of the engine 1 as a driving source. A pump pulley 6a provided at an input shaft of the fuel pump 6 is connected to a crank pulley 1a via a belt 7.

In the fuel injection system thus constructed, when the rotation torque of the crankshaft is transmitted to the input shaft of the fuel pump 6, the fuel pump 6 discharges the fuel at a pressure corresponding to the rotation torque transmitted to the input shaft of the fuel pump 6 from the crankshaft.

The fuel discharged from the fuel pump 6 is supplied to the common rail 4 via the fuel supply pipe 5, then is accumulated to a predetermined pressure in the common rail 4, and is distributed to each fuel injection valve 3 of each cylinder 2. Then, when a driving current is applied to each fuel injection valve 3, each fuel injection valve 3 is opened, and as a result, the fuel is injected therefrom into each cylinder 2.

An intake branch-pipe 8 is connected to the engine 1. Each branch pipe of the intake branch-pipe 8 is connected to each combustion chamber in each cylinder 2 via an intake port (not shown).

The intake branch-pipe 8 is also connected to an intake pipe 9. A compressor housing 15a of a centrifugal super charger (turbo charger) 15 operating by thermal energy of the exhaust gas as the driving source is provided at a certain point of the intake pipe 9. Further, an inter-cooler 16 is provided in the intake pipe 9 on the downstream side of the compressor housing 15a for cooling intake air whose temperature has become high by being compressed in the compressor housing 15a.

In the intake system thus constructed, the intake air flows into the compressor housing 15a via the intake pipe 9.

The intake air flowing into the compressor housing 15a is compressed by the rotation of a compressor wheel provided inside of the compressor housing 15a. The intake air whose temperature has become high by being compressed in the compressor housing 15a is cooled in the inter-cooler 16 and then flows into the intake branch-pipe 8. The intake air flowing into the intake branch-pipe 8 is distributed into each combustion chamber of each cylinder 2 via each branch, and is burned by the fuel injected from each fuel injection valve 3 of each cylinder 2 as an ignition source.

Meanwhile, an exhaust branch-pipe 18 is connected to the engine 1. Each branch pipe of the exhaust branch-pipe 18 communicates with each combustion chamber of each cylinder 2 via an exhaust port (not shown).

The exhaust branch-pipe 18 is connected to a turbine housing 15b of the turbo charger 15. One end of an exhaust pipe 19 is connected to the turbine housing 15b and the other end of the exhaust pipe 19 is connected to a muffler (not shown).

The exhaust pipe 19 is branched into a first exhaust pipe 19a and a second exhaust pipe 19b at a portion downstream of the turbo charger 15. A fist filter 20a is provided at a certain point of the first exhaust pipe 19a and a second filter 20b is provided at a certain point of the second exhaust pipe 19b. The first filter 20a and the second filter 20b are particulate filters (hereinafter they are simply referred to as filters) supporting occlusion-reduction type NOx catalysts. In the embodiment of the invention, "filters 20" denotes both the first filter 20a and the second filter 20b. Filter temperature sensors 24a and 24b are provided at the first filter 20a and the second filter 20b for outputting a signal according to the temperatures of the filters 20, respectively. Further, an exhaust pressure sensor 37 for outputting the signal according to the pressure of the exhaust gas is provided in the exhaust pipe 19 on the downstream side of the turbo charger 15.

A flow passage switching valve 22a, which is opened and closed in response to the signal from an electronic control unit (ECU) 35, is provided in the first exhaust pipe 19a downstream of the first filter 20a. In addition, a flow passage switching valve 22b, which is opened and closed in response to the signal from the ECU 35, is provided in the second exhaust pipe 19b downstream of the second filter 20b. The first exhaust pipe 19a and the second exhaust pipe 19b are joined together at a portion downstream of the flow passage switching valves 22a and 22b, and then connected to the muffler. Reducing agent injection valves 28a and 28b, which are opened in response to a signal from the ECU 35 and injects the fuel as a reducing agent, are provided upstream of the first filter 20a and the second filter 20b, respectively. In the embodiment of the invention, "flow passage switching valves 22" denotes both the flow passage switching valve 22a and the flow passage switching valve 22b.

The diesel engine is excellent in terms of fuel efficiency. On the other hand, it is an important issue to remove particulate matters (hereinafter they are referred to as PM), such as soot which is a suspended particulate matter contained in the exhaust gas. Thus, in the embodiment of the invention, the particulate filter (hereinafter it is simply referred to as a filter) for trapping the PM is provided in the exhaust gas system of the diesel engine in order to prevent the PM from being emitted into the atmosphere.

Next, the filters 20 will be described.

Figure 2A:
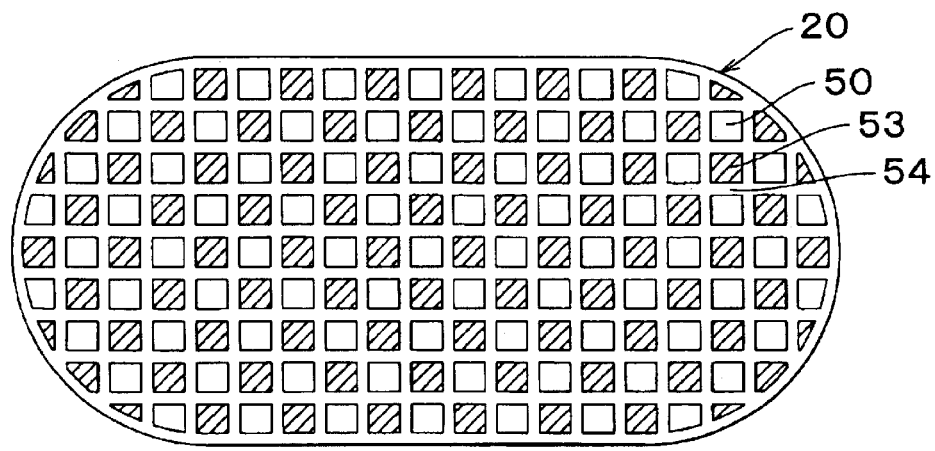
FIG. 2A is a transverse cross-sectional view of a particulate filter and FIG. 2B is a vertical cross-sectional view of the particulate filter.
Figure 2B:
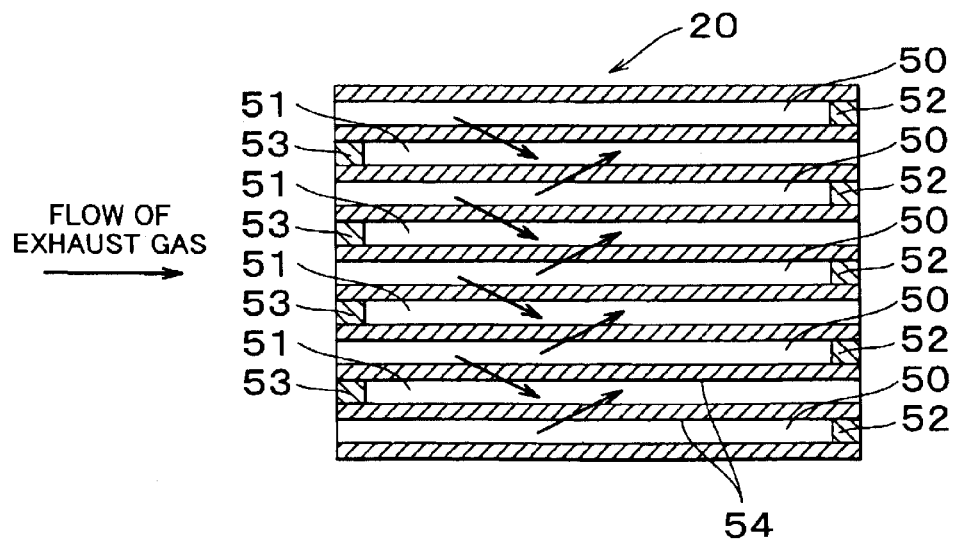

FIG. 2A and FIG. 2B show a structure of the filters 20. FIG. 2A shows a transverse cross-section of the filters 20 and FIG. 2B shows a vertical cross-section of the filters 20. The filters 20 are a wall-flow type having multiple exhaust gas flow passages extending in parallel each other. These exhaust gas flow passages include exhaust gas inflow passages 50 whose ends on the downstream side are blocked with stoppers 52 and exhaust gas outflow passages 51 whose ends on the upstream side are blocked with stoppers 53. In FIG. 2A, portions with hatching show the stoppers 53. The exhaust gas inflow passages 50 and the exhaust gas outflow passages 51 are alternated via thin-walled dividing walls 54. In other words, each exhaust gas inflow passage 50 is surrounded by four exhaust gas outflow passages 51 and each exhaust gas outflow passage 51 is surrounded by four exhaust gas inflow passages 50.

The filters 20 are formed from a porous material such as cordierite. Thus, the exhaust gas flowing into the exhaust gas inflow passages 50 flows out to the neighboring exhaust gas outflow passages 51 through the dividing walls 54 as shown by allows in FIG. 2B.

According to the embodiment of the invention, a layer of a carrier of alumina is formed on a surface of a peripheral wall of each exhaust gas inflow passage 50 and each exhaust gas outflow passage 51, i.e., on both sides of a surface of each dividing wall 54 and on an inner wall with pores of each dividing wall 54. The occlusion-reduction type NOx catalyst is supported on the carrier.

Next, an operation of the occlusion-reduction type NOx catalyst supported by the filters 20 will be described.

In the filters 20, alumina is provided as the carrier, and the carrier supports at least one selected from alkali metal such as kalium (K), sodium (Na), lithium (Li) or cesium (Cs), alkaline earth such as barium (Ba) or calcium (Ca), and rare earth such as lanthanum (La) or yttrium (Y), and a noble metal such as platinum (Pt).

The NOx catalyst thus constructed absorbs the nitrogen oxides (NOx) in the exhaust gas when the oxygen concentration of the exhaust gas flowing into the NOx catalyst is high.

Meanwhile, when the oxygen concentration of the exhaust gas flowing into the NOx catalyst decreases, the NOx catalyst emits the absorbed nitrogen oxides (NOx). At this time, the NOx catalyst can reduce the nitrogen oxides (NOx) emitted from the NOx catalyst into nitrogen ($N_2$) if the reducing component such as hydrogen carbide (HC) or carbon monoxide (CO) exists in the exhaust gas.

In the exhaust system thus constructed, an air-fuel mixture (burned gas) burned in each cylinder 2 of the engine 1 is discharged into the exhaust branch-pipe 18 via the exhaust port and flows into the turbine housing 15b of the turbo charger 15. The exhaust gas flowing into the turbine housing 15b rotates the turbine wheel rotatably supported within the turbine housing 15b by using the thermal energy of the exhaust gas. At this time, the rotation torque of the turbine wheel is transmitted to the compressor wheel of the compressor housing 15a.

The exhaust gas discharged from the turbine housing 15b flows into the filters 20 via the first exhaust pipe 19a and the second exhaust pipe 19b. Then, the PM in the exhaust gas is trapped, and poisonous gas components are removed or purified. The exhaust gas in which the PM has been trapped and the poisonous gas components have been removed or purified in the filters 20 flows in the exhaust pipe 19 and then is emitted into the atmosphere via the muffler (not shown). In this case, both flow passage switching valves 22 are opened.

The exhaust branch-pipe 18 and the intake branch-pipe 8 communicate with each other via an exhaust recirculation passage (EGR passage) 25 for recirculating a part of the exhaust gas flowing in the exhaust branch-pipe 18 into the intake branch-pipe 8. At a certain point of the EGR passage 25, there is provided a flow amount control valve (EGR valve) 26 which is composed of an electromagnetic valve or the like and changes the flow amount of the exhaust gas flowing in the EGR passage 25 according to a level of voltage applied to the EGR valve.

At a certain point of the EGR passage 25 upstream of the ECR valve 26, there is provided an EGR cooler 27 which cools an EGR gas flowing in the EGR passage 25. A cooling water passage (not shown) is provided in the EGR cooler 27, and a part of the cooling water for cooling the engine 1 is circulated in the cooling water passage.

In the exhaust recirculation mechanism thus constructed, when the EGR valve 26 is opened, it becomes possible for the exhaust gas to flow in the EGR passage 25. Then, a part of the exhaust gas flowing in the exhaust branch-pipe 18 flows into the EGR passage 25 and is guided to the intake branch-pipe 8 through the EGR cooler 27.

At this time, heat-exchange is performed between the EGR gas flowing in the EGR passage 25 and the cooling water of the engine 1 in the EGR cooler 27. Then the EGR gas is cooled.

The EGR gas flowing back to the intake branch-pipe 8 from the exhaust branch-pipe 18 via the EGR passage 25 is guided to each combustion chamber of each cylinder 2 while being mixed with a new exhaust gas flowing from the upstream of the intake branch-pipe 8.

The EGR gas contains an inert gas component such as water ($H_2O$) and carbon dioxide ($CO_2$), which does not burn by itself and has an endothermic feature. Therefore, when the EGR gas is contained in the air-fuel mixture, a combustion temperature of the air-fuel mixture is lowered and thus a generation amount of the nitrogen oxides (NOx) can be reduced.

As described above, the ECU 35 is provided along with the engine 1. This ECU 35 is a unit for controlling an operation state of the engine 1 according to the operation condition of the engine 1 and a request of a driver.

The ECU 35 is connected to various sensors such as the common rail pressure sensor 4a, the filter temperature sensors 24a and 24b, a crank position sensor 33, a water temperature sensor 34, an accelerator pedal opening sensor 36, the exhaust pressure sensor 37 via electric wires. Output signals from such sensors mentioned above are input into the ECU 35.

In addition, the ECU 35 is connected to the fuel injection valves 3, the flow passage switching valves 22, the EGR valve 26, and the like via the electric wires. Thus, the ECU 35 can control these valves.

Figure 3:
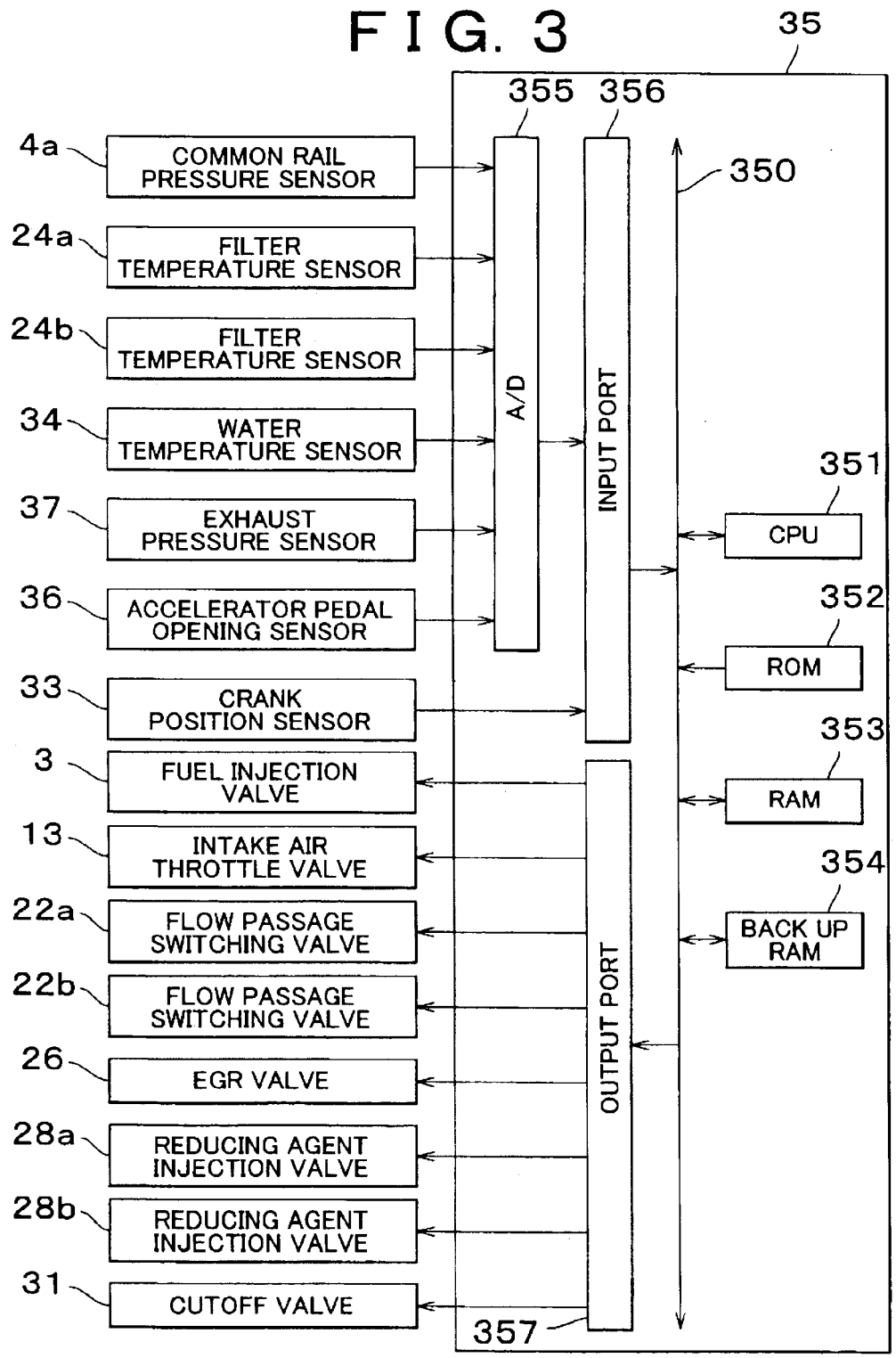
FIG. 3 is a block diagram showing an internal structure of an ECU.

As shown in FIG. 3, the ECU 35 includes a CPU 351, a ROM 352, a RAM 353, a back up RAM 354, an input port 356, and an output port 357, which are connected with each other via a bi-directional bus 350. In addition, the ECU 35 includes an A/D converter 355 connected to the input port 356.

The input port 356 receives the output signals of the sensors such as the crank position sensor 33 outputting a signal in a digital form, and then transmits the output signals to, for example, the CPU 351 and the RAM 353.

Further, the input port 356 receives the output signals of the sensors such as the common rail pressure sensor 4a, the filter temperature sensors 24a and 24b, the water temperature sensor 34, the exhaust pressure sensor 37, which output the signals in an analog form, via the A/D 355, and then transmits the output signals to, for example, the CPU 351 and the RAM 353.

The output port 357 is connected to the fuel injection valves 3, the flow passage switching valves 22, the EGR valve 26, a cutoff valve 31 and the like via the electric wires. The output port 357 also transmits control signals output from the CPU 351 to the fuel injection valves 3, the flow passage switching valves 22, the EGR valve 26, the cutoff valve 31 and the like.

The ROM 352 memorizes various application programs.

The ROM 352 also memorizes various control maps in addition to the various application programs mentioned above.

The RAM 353 stores the output signal from each sensor, a calculation result of the CPU 351 and the like. The calculation result is, for example, an engine rotation number calculated based on time intervals at which the crank position sensor 33 outputs the pulse signal. Data on the engine rotation number is updated each time the crank position sensor 33 outputs the pulse signal.

The back up RAM 354 is a non-volatile memory that can memorize data after the engine 1 stops operating.

The CPU 351 operates according to the application programs stored in the ROM 352 so as to execute various controls.

When the engine 1 is operated in the lean burn state, the air-fuel ratio of the exhaust gas discharged from the engine 1 becomes lean, so that the oxygen concentration of the exhaust gas becomes high. Thus, the nitrogen oxides (NOx) contained in the exhaust gas is absorbed in the NOx catalyst. However, if the engine 1 continues to operate in the lean burn state for a long time of period, the amount of the NOx absorbed in the NOx catalyst reaches the saturation amount. Thus the nitrogen oxides (NOx) in the exhaust gas cannot be absorbed in the NOx catalyst any further and then are discharged into the atmosphere.

Particularly, in a diesel engine such as the engine 1, the air-fuel mixture at the lean air-fuel ratio is burned in a major part of the driving region of the engine 1 and thus the air-fuel ratio of the exhaust gas becomes lean within the major part of the driving region. Therefore, the NOx absorbed in the NOx catalyst easily reaches the saturation amount.

Accordingly, when the engine 1 is driven in the lean burn state, the oxygen concentration of the exhaust gas flowing into the NOx catalyst needs to be lowered before the NOx absorbed in the NOx catalyst reaches the saturation amount. In addition, the concentration of the reducing agent needs to be increased in order to emit and reduce the nitrogen oxides (NOx) absorbed in the NOx catalyst.

Accordingly, the exhaust gas purifying apparatus for an internal combustion engine according to the embodiment of the invention includes a reducing agent supply mechanism for supplying the fuel (diesel oil) as the reducing agent to the exhaust gas upstream of the filters 20. Thus, the oxygen concentration of the exhaust gas flowing into the filters 20 is decreased and the concentration of the reducing agent is increased due to supply of the fuel to the exhaust gas by the reducing agent supply mechanism.

In the reducing agent supply mechanism, as shown in FIG. 1, injection holes are provided so as to face inside of the first exhaust pipe 19a and the second exhaust pipe 19b. The reducing agent supply mechanism includes the reducing agent injection valves 28a and 28b which are opened in response to the signal from the ECU35 for injecting the fuel, a reducing agent supply passage 29 for guiding the fuel discharged from the fuel pump 6 to the reducing agent injection valves 28a and 28b, and the cutoff valve 31 which is provided in the reducing agent supply passage 29 and which cuts off the flow of the fuel in the reducing agent supply passage 29.

In the reducing agent supply mechanism, the fuel at a high pressure discharged from the fuel pump 6 is applied to the reducing agent injection valves 28a and 28b via the reducing agent supply passage 29. Then, the reducing agent injection valves 28a and 28b are opened in response to the signal from the ECU 35, and the fuel as the reducing agent is injected into the first exhaust pipe 19a and the second exhaust pipe 19b.

By the reducing agent injected into the first exhaust pipe 19a and the second exhaust pipe 19b from the reducing agent injection valves 28a and 28b, respectively, the exhaust gas with the low oxygen concentration is produced. When the exhaust gas with the low oxygen concentration flows into the filter 20a or 20b, the nitrogen oxides (NOx) absorbed in the filter 20a or 20b is emitted and reduced into nitrogen ($N_2$).

Subsequently, the reducing agent injection valve 28a or 28b are closed in response to the signal from the ECU 35 and then the supply of the reducing agent into the first exhaust pipe 19a or the second exhaust pipe 19b is stopped.

Next, an NOx purifying control for reducing NOx in the occlusion-reduction type NOx catalyst supported in the filters 20 and emitting the NOx will be described in detail.

According to the NOx purifying control, the CPU 351 performs a so-called rich spike control. In the rich spike control, the oxygen concentration of the exhaust gas flowing into the filters 20 is decreased at relatively short intervals and in a spike manner (in a short time).

When both flow passage switching valves 22a and 22b are opened, substantially the same amount of the exhaust gas flows in the filters 20. In this case, if the reducing agent is supplied to the exhaust gas, a large amount of the reducing agent is required for bringing the oxygen concentration to a level needed for purification. Thus, the fuel efficiency is deteriorated. Accordingly, in the embodiment of the invention, one of the passage switching valves is closed so that the exhaust gas flowing in one of the filters is decreased. In addition, the reducing agent is supplied to the filter in which a decreased amount of the exhaust gas flows. Thus, the required oxygen concentration can be obtained by a small amount of the reducing agent by decreasing the amount of the exhaust gas flowing in the filter.

In the embodiment of the invention, emitting and reducing of the NOx absorbed in the first filter 20a are described. However, the same processing can be performed in the second filter 20b as well.

In the rich spike control mentioned above, the CPU 351 determines whether or not an execution condition of the rich spike control is satisfied at predetermined intervals. Examples of the execution condition of the rich spike control include a condition that the first filter 20a is in an activation state, a condition that the output signal value of the exhaust gas temperature sensor (exhaust gas temperature) is equal to or smaller than a predetermined upper limit value, and a condition that a poisoning recovery control is not executed.

When it is determined that the execution condition of the rich spike control mentioned above is satisfied, the CPU351 closes the flow passage switching valve 22a. By controlling the reducing agent injection valve 28a so that the fuel as the reducing agent is injected in the spike manner from the reducing agent injection valve 28a, the air-fuel ratio of the exhaust gas flowing into the first filter 20a is temporarily made equal to a predetermined target rich air-fuel ratio.

Specifically, the CPU 351 reads the engine rotation number, the output signal (an accelerator pedal opening) of the accelerator pedal opening sensor 36, the output signal value (intake air amount) of an air flow meter (not shown), the output signal of the air-fuel ratio sensor, the fuel injection amount and the like, which are memorized in the RAM 353.

The CPU 351 accesses a reducing agent supply amount control map in the ROM 352 using the engine rotation number, the accelerator pedal opening, the intake air amount, and the fuel injection amount as parameters, and calculates the supply amount of the reducing agent (target supply amount) required for making the air-fuel ratio of the exhaust gas equal to a target air-fuel ratio which has been previously set.

Next, the CPU 351 accesses a reducing agent injection valve control map in the ROM 352 using the target supply amount as a parameter, and calculates a valve opening time period (target valve opening time period) of the reducing agent injection valve 28 required for injecting the target supply amount of the reducing agent from the reducing agent injection valve 28a.

When the target valve opening time period of the reducing agent injection valve 28a is calculated, the CPU 351 opens the reducing agent injection valve 28a.

Then, when the target valve opening time period has passed after the reducing agent injection valve 28a is opened, the CPU 35a closes the reducing agent injection valve 28a.

Accordingly, when the reducing agent injection valve 28a is opened for the target valve opening time period, the target supply amount of the fuel is injected into the first exhaust pipe 19a from the reducing agent injection valve 28a. The reducing agent injected from the reducing agent injection valve 28a is mixed with the exhaust gas flowing from the upstream of the first exhaust pipe 19a to produce the air-fuel mixture at the target air-fuel ratio. Then, this exhaust gas at the target air-fuel ratio flows into the first filter 20a.

As a result, the oxygen concentration of the exhaust gas flowing into the first filter 20a varies at relatively short intervals, and thus the first filter 20a repeats absorbing and reducing of the nitrogen oxides (NOx) alternately at short intervals.

Meanwhile, the PM trapped in the filter is burned and removed by the exhaust gas at a high temperature discharged when the engine is operated in a region of fast rotation and high load. However, since it takes a certain time to burn the PM, the PM may remain unburned if the operation region of the engine departs from the fast rotation and high load region before the PM is completely burned and removed. In addition, the PM is not burned and is accumulated in the filter if the engine is operated under low load for a long time. Since it is difficult to maintain the engine in an operation state suitable for burning the PM, the unburned PM is gradually accumulated in the filter, which causes clogging of the filter.

The fuel supply to the exhaust gas is also effective as a method for effectively removing the unburned PM.

When the fuel is supplied to the exhaust gas, the temperatures of the filters 20 are raised according to the catalytic reaction (oxidative reaction). At this time, the PM changes in quality so as to be easily oxidized since active oxygen is discharged as a result of the fuel flowing into the filter. Therefore, the PM amount which can be oxidized and removed per unit time is improved. In addition, the oxygen poisoning of the catalyst is removed and the activity of the catalyst is improved by the fuel supply, so that the active oxygen is easily discharged. Then, the PM is oxidized, burned and removed by the active oxygen.

According to the embodiment of the invention, during normal operation, both the flow passage switching valves 22a and 22b are opened and thus the exhaust gas flows in the first exhaust pipe 19a and the second exhaust pipe 19b so that the exhaust gas is purified by two filters at the same time. As a result, the flow amount of the exhaust gas in each filter can be decreased by half, and thus the filter capacity can be decreased. However, if the temperature of the exhaust gas is low, the temperatures of both the filters are decreased at the same time, and the purification efficiency is decreased. In the occlusion-reduction type NOx catalyst supported in the filters 20, the efficiency of purifying NOx, HC, and the like varies depending on the temperature of the NOx catalyst. Thus, it is important to maintain the temperature of the occlusion-reduction type NOx catalyst at a level at which the efficiency of purifying NOx, HC, and the like is high.

If the flow passage switching valve of one of the filters is closed to decrease the flow amount of the exhaust gas in order to suppress deterioration of the fuel consumption and the fuel is supplied for a heating control, the energy of the exhaust gas can hardly be obtained. This is disadvantageous for raising the temperature promptly. As a result, it takes a longer time to raise the temperature of the exhaust gas to a temperature range in which the exhaust gas can be purified, and thus the exhaust emission may be deteriorated during the time period.

Accordingly, in the embodiment of the invention, the exhaust gas is allowed to flow in one of the filters and the temperature of the filter is raised when the temperature of the exhaust gas is low. Therefore, a time until at least one of the filters starts to function is shortened.

In the occlusion-reduction type NOx catalyst according to the embodiment of the invention, the temperature range (temperature window) in which NOx can be purified and the temperature range in which HC can be purified are different. Specifically, HC can be purified at a lower temperature as compared to NOx. Thus, the temperature range in which the HC can be purified but the NOx cannot be sufficiently purified exists. In addition, in the temperature range in which the HC cannot be sufficiently purified, the temperature of the occlusion-reduction type NOx catalyst may not be raised by the oxidative reaction heat even if the fuel is supplied to the NOx catalyst.

Accordingly, in the embodiment of the invention, when the temperature of the occlusion-reduction type NOx catalyst is in the temperature range in which the HC cannot be sufficiently purified, the temperature of the exhaust gas is raised so as to raise the temperature of the occlusion-reduction type NOx catalyst by the method described later. On the other hand, if the temperature of the occlusion-reduction type NOx catalyst is in the temperature range in which the HC can be purified, the temperature of the occlusion-reduction type NOx catalyst is raised by supplying the fuel to the occlusion-reduction type NOx catalyst. When the temperature of the occlusion-reduction type NOx catalyst is in the temperature range in which HC can be purified, the temperature of the occlusion-reduction type NOx catalyst is not raised by raising the temperature of the exhaust gas. It is because, when the temperature of the occlusion-reduction type NOx is such a temperature range, the required fuel amount is smaller, the deterioration of the fuel consumption can be suppressed, and the generation of smoke can be suppressed if the fuel is directly supplied to the occlusion-reduction type NOx catalyst. In the embodiment of the invention, the temperature of the filter and the temperature of the occlusion-reduction type NOx catalyst have the same meaning.

Next, a method for raising the temperature of the exhaust gas for raising the temperatures of the filters 20 will be described.

According to the embodiment of the invention, in order to raise the temperature of the exhaust gas, secondary injection can be employed for injecting the fuel again at timing at which the fuel is not injected for the engine output after a main injection for injecting the fuel into the engine 1 for the engine output, If the fuel injection amount injected by the main injection is increased, the operation state of the engine may deteriorate due to the increased engine output. Thus, the fuel is secondarily injected during an expansion stroke as mentioned above. The fuel injected by the secondary injection is burned in each cylinder 2 so as to raise the gas temperature in each cylinder. The gas whose temperature is raised reaches the filters 20 in a form of the exhaust gas so as to raise the temperature of the filter.

If a relationship among the accelerator pedal opening, the engine rotation number, and the secondary injection amount or the secondary injection timing is previously mapped and is memorized in the ROM 352, the injection amount and timing of the secondary injection can be calculated based on the map, the accelerator pedal opening and the engine rotation number.

The temperature of the exhaust gas can be raised also by delaying timing of the main injection from the fuel injection valves 3 (hereinafter it is referred to as delay injection). If the fuel injection timing is delayed relative to normal timing, the energy consumed for a piston action is decreased and thus the temperature of the exhaust gas is raised. However, if the engine 1 is operated by the delayed fuel injection, the combustion state becomes unstable. Thus, a time period by which the fuel injection can be delayed is limited depending on the operation state of the engine 1. Accordingly, in the embodiment of the invention, the fuel is injected prior to the delay injection when the piston, which has completed an exhaust stroke, is in the vicinity of a top dead center. Then, the fuel is evaporated and thus becomes easy to ignite during a subsequent intake stroke and a compression stroke. Therefore, the combustion can be stabilized. Therefore, the fuel injection timing is further delayed, so that the temperature of the exhaust gas can be further raised.

Further, the EGR amount may be increased in the embodiment of the invention. Since the temperature of the EGR gas is high, the temperature of the intake air is raised by the EGR gas, which results in an increase in the temperature of the exhaust gas. In order to increase the amount of the EGR gas, for example, it is possible to employ a method in which the pressure in the intake branch-pipe 8 is decreased by closing an intake air throttle valve 13, thereby increasing a difference between a pressure in the intake branch-pipe 8 and a pressure in the exhaust branch-pipe 18. In addition, it is possible to employ a method in which the pressure in the exhaust branch-pipe 18 is increased by closing the flow passage switching valves 22a and 22b, thereby increasing the difference between the pressure in the intake branch-pipe 8 and the pressure in the exhaust branch-pipe 18.

As described above, the temperature of the exhaust gas can be raised by the delay of the fuel injection timing, the secondary injection after the main injection (secondary injection), or the increase in the EGR amount. Then, the temperatures of the filters 20 can be raised. As a result, the temperatures of the filters 20 can be raised to a temperature range in which the HC can be purified.

Next, a filter heating control according to the embodiment of the invention will be described. The filter heating control is performed when the temperature of the filter is low, for example, when the engine 1 is started, or when the engine 1 continues to be operated under low load.

Figure 4:
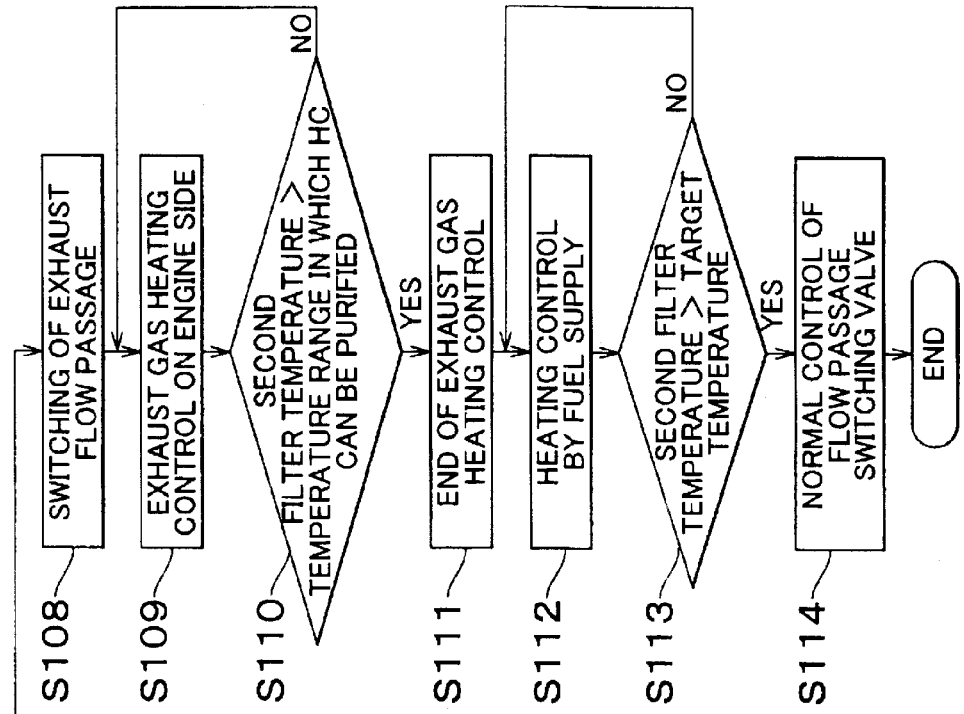
FIG. 4 is a flow chart showing a flow of a filter heating operation according to a first embodiment of the invention.
Figure 4:
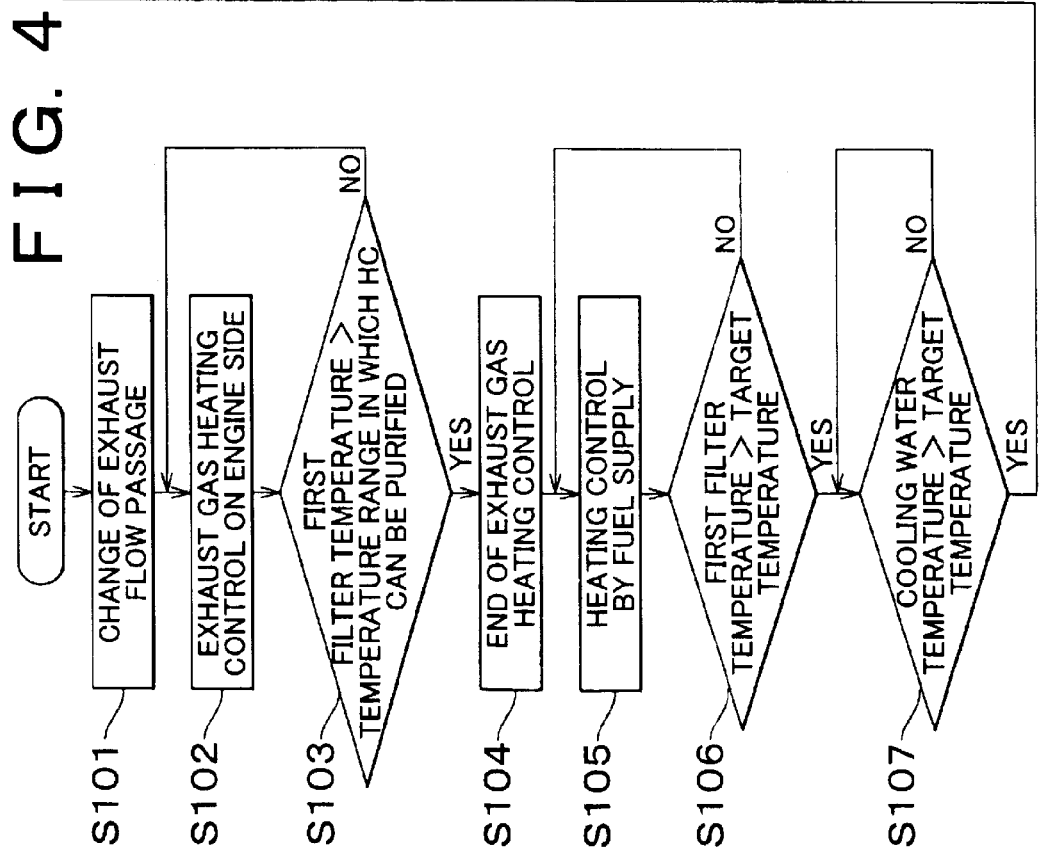

FIG. 4 is a flow chart showing a flow of the filter heating control.

In step S101, the flow passage switching valve 22a is opened and the flow passage switching valve 22b is closed.

In step S102, the temperature of the exhaust gas discharged from the engine 1 is raised. As a method for raising the temperature of the exhaust gas, for example, the secondary injection, the delay injection, or the increase in the EGR amount can be employed.

In step S103, it is determined whether the bed temperature of the first filter 20a is in a temperature range in which HC can be sufficiently purified. The CPU 351 reads the output signal from the filter temperature sensor 24a and determines the temperature of the first filter 20a. If the fuel is supplied from the reducing agent injection valve 28a to the first filter 20a in a case where the temperature thereof is lower than a temperature range in which the HC can be sufficiently purified, the fuel that cannot be purified in the occlusion-reduction type NOx catalyst passes through the first filter 20a and is emitted into the atmosphere Thus, in the temperature range in which the HC cannot be purified, the temperature of the first filter 20a is raised by raising the temperature of the exhaust gas, thereby suppressing the deterioration of the exhaust emission. On the other hand, if the bed temperature of the first filter 20a reaches the temperature window in which the HC can be sufficiently purified, the temperature of the first filter 20a can be raised by supplying the reducing agent thereto from the reducing agent injection valve 28a.

If an affirmative determination is made in step S103, the process proceeds to step S104. On the other hand, if a negative determination is made in step S103, the process returns to step S102.

In step S104, the increase in the temperature of the exhaust gas, which has been started in step S102, is finished.

In step S105, the heating control for the first filter 20a is performed by injecting the fuel from the reducing agent injection valve 28a. In this fuel injection, the injection interval is made short and the injection amount per each injection is made small compared to the fuel injection for emitting the NOx. As a result, the fuel amount that can be purified in the filters 20 can be supplied. In addition, the amount of the fuel passing through the filters 20 without being purified in the filters 20 is decreased and thus the deterioration of the fuel consumption can be suppressed. An opening time period and opening timing of the reducing agent injection valve 28a may be previously mapped along with the engine rotation number and the engine load, and stored in the ROM 352.

In step S106, it is determined whether the bed temperature of the first filter 20a is in a temperature range in which the NOx can be sufficiently purified. The CPU 351 reads the output signal from the filter temperature sensor 24a and determines the temperature of the first filter 20a.

If an affirmative determination is made in step S106, the process proceeds to step S107. On the other hand, if a negative determination is made in step S106, the process returns to step S105.

In step S107, it is determined whether the temperature of the cooling water reaches a target temperature (75 degrees, for example).

If the temperature of the cooling water is low at the engine start or the like, the exhaust emission may be deteriorated. In this case, if the exhaust gas is allow to flow in the second filter 20b in an inactive state, a hazardous component in the exhaust gas is emitted into the atmosphere without being purified. Thus, the heating of the second filter 20b is started when the temperature of the cooling water reaches the target temperature (75 degrees, for example), i.e., when warm-up is completed.

If an affirmative determination is made in step S107, the process proceeds to step S108. On the other hand, if a negative determination is made in step S107, the process returns to step S107.

In step S108, the flow passage of the exhaust gas is switched. The CPU 351 opens the flow passage switching valve 22b and then closes the flow passage switching valve 22a.

In step S109, the temperature of the exhaust gas discharged from the engine 1 is raised. As a method for raising the temperature of the exhaust gas, for example, the above-mentioned secondary injection, the delay injection, or the increase in the EGR amount can be employed.

In step S110, it is determined whether the bed temperature of the second filter 20b is in a temperature range in which the HC can be sufficiently purified. The CPU 351 reads the output signal from the filter temperature sensor 24b and determines the bed temperature of the second filter 20b. If the fuel is supplied from the reducing agent injection valve 28b in a case where the temperature of the second filter 20b is lower than the temperature range in which the HC can be purified, the fuel that cannot be purified in the occlusion-reduction type NOx catalyst passes through the second filter 20b, and is emitted into the atmosphere. Thus, in the temperature range in which the HC cannot be purified, the temperature of the second filter 20b is increased by increasing the temperature of the exhaust gas, thereby suppressing the deterioration of the exhaust emission. On the other hand, if the temperature of the second filter 20b reaches the temperature window in which the HC can be sufficiently purified, the temperature of the second filter 20b can be raised by supplying the reducing agent from the reducing agent injection valve 28b.

If an affirmative determination is made in step S110, the process proceeds to step S111. On the other hand, if a negative determination is made in step S110, the process returns to step S109.

In step S111, the increase in the temperature of the exhaust gas, which has started in step S109, is finished.

In step S112, the heating control for the second filter 20b is performed by injecting the fuel from the reducing agent injection valve 28b.

In step S113, it is determined whether the bed temperature of the second filter 20b is in a temperature range in which the NOx can be sufficiently purified. The CPU 351 reads the output signal from the second temperature sensor 24b and determines the temperature of the second filter 20b.

If an affirmative determination is made in step S113, the process proceeds to step S114. On the other hand, if a negative determination is made in step S113, the process returns to step S112.

In step S114, both the flow passage switching valves 22a and 22b are opened, so that the exhaust gas is allowed to flow in the filters 20a and 20b.

Figure 5:
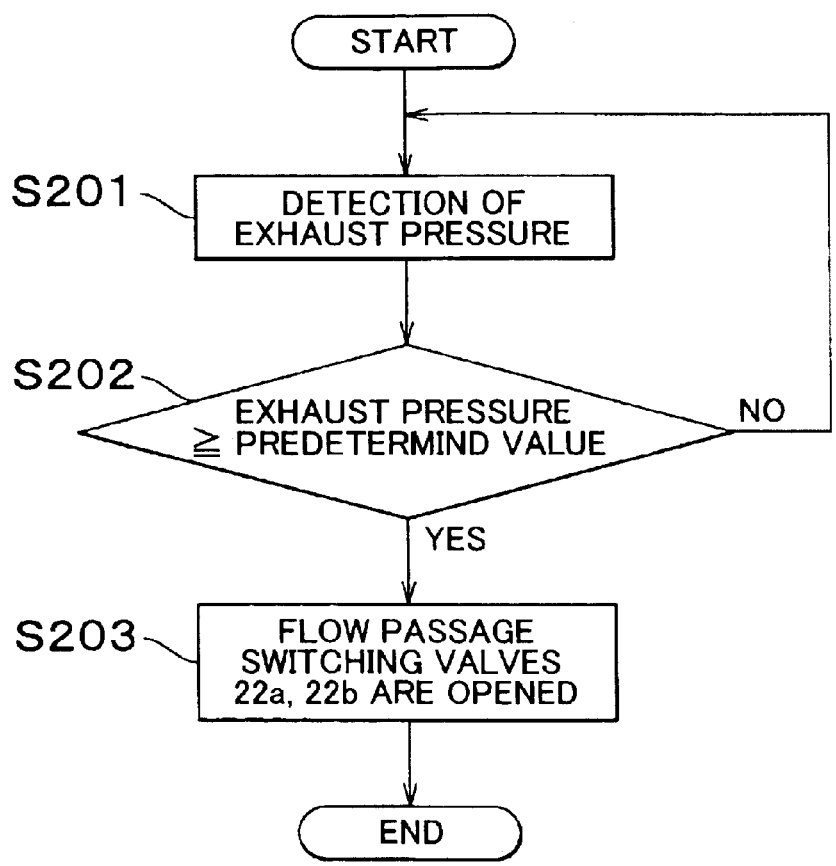
FIG. 5 is a flow chart showing a flow for decreasing an exhaust gas pressure upstream of a catalyst.

In this case, if either one of the flow passage switching valves is closed, the area of a flow passage is decreased, so that the pressure of the exhaust gas is increased. In this state, the output of the engine 1 may decrease or the filter may be broken. Accordingly, if the output signal of the exhaust pressure sensor 37 becomes equal to or greater than a predetermined value during the heating control, the flow passage switching valves 22a and 22b are fully opened so as to decrease the pressure of the exhaust gas. FIG. 5 is a flow chart showing a pressure reduction control for the exhaust gas pressure. In step S201, the output signal from the exhaust pressure sensor 37 is input. In step S202, it is determined whether the output signal from the exhaust pressure sensor 37 is equal to or greater than a predetermined value. If it is determined that the output signal is equal to or greater than the predetermined value in step S202, it is estimated that the pressure of the exhaust gas upstream of the filters 20a and 20b becomes equal to or higher than the predetermined value. Then, in step S203, the flow passage switching valves 22a and 22b are fully opened so as to reduce the pressure of the exhaust gas. As the predetermined value used for determination, a value at which the output of the engine 1 does not increase and the filters 20 are not broken is previously obtained. Then, the predetermined value is stored in the ROM 352.

In the embodiment of the invention, it is possible to allow the exhaust gas to flow in one filter 20a and to raise the temperature thereof. Therefore, it is possible to raise the temperature of one filter to a temperature range in which the NOx can be purified. In addition, since the heating of the other filter 20b is started after the warm-up of the engine 1 is completed, the deterioration of the exhaust emission can be suppressed while the other filter 20b is heated.

In the embodiment of the invention, the target temperature of the filters 20 is set to a temperature range in which the NOx can be purified. However, instead, the target temperature may be set to a temperature at which the PM can be oxidized. By this setting, the PM can be removed without being accumulated in the filters 20.

<Second Embodiment>

The differences between the first embodiment and the second embodiment will be described.

In the first embodiment, while one filter is heated, the exhaust gas is not allowed to flow in the other filter. On the other hand, in the second embodiment, a small amount of the exhaust gas is allowed to flow in the other filter.

That is, in the second embodiment, the flow passage switching valve 22b is slightly opened while the flow passage switching valve 22a is fully opened in step S101 shown in FIG. 4 in the first embodiment. Thus, the second filter 20b can be gradually heated while the first filter 20a is heated. Accordingly, after the heating of the first filter 20a is completed, the temperature of the second filter 20b can be promptly raised to the active temperature.

In step S108, the flow passage switching valve 22a is slightly opened while the flow passage switching valve 22b is fully opened. Thus, the first filter 20a can obtain the energy of the exhaust gas while the second filter 20b is heated, so that the decrease in the temperature of the first filter 20a can be suppressed. Thus, there is an advantage that the pressure of the exhaust gas is not substantially increased during the heating control.

Since the basic hardware structure is the same as that in the first embodiment, the description thereof will be omitted.

In the second embodiment, the target temperature of the filters 20 is set to a temperature at which the NOx can be purified. However, the target temperature of the filters 20 may be set to a temperature at which the PM can be oxidized. By this setting, the PM can be removed without being accumulated in the filters 20.

<Third Embodiment>

The differences between the first embodiment and the third embodiment will be described.

In the first embodiment, while one filter is heated, the exhaust gas is not allowed to flow in the other filter. On the other hand, in the second embodiment, the same amount of the exhaust gas is allowed to flow in both filters so as to heat the filters.

In addition, when the filters are heated by supplying the fuel thereto, the air-fuel ratio of the exhaust gas is made slightly higher than a stoichiometric air-fuel ratio by adjusting the fuel supply amount.

If the flow amount of the exhaust gas is decreased by closing the flow passage switching valves 22 so as to emit the NOx occluded in the occlusion-reduction type NOx catalyst, the air-fuel ratio of the exhaust gas can be brought to a level close to the stoichiometric air-fuel ratio by supplying only a small amount of fuel. Therefore, the deterioration of the fuel consumption can be suppressed. However, if the flow amount of the exhaust gas is decreased by closing the flow passage switching valve, the energy of the exhaust gas cannot be obtained. As a result, it takes time to heat the filters. Further, if the air-fuel ratio of the exhaust gas is made rich, a part of the supplied fuel cannot be oxidized due to a lack of oxygen. As a result, the increase in the temperature with respect to the fuel supply amount becomes small.

Thus, in order to raise the temperatures of the filters promptly, it is desirable that a larger amount of the exhaust gas be allowed to flow in the filters than when the NOx is reduced in the NOx catalyst and the air-fuel ratio of the exhaust gas be made rich.

Accordingly, in the third embodiment, in a case where the temperatures of the filters 20 need to be increased and the temperatures of the filters 20 are lower than the temperature range in which the HC can be purified, flow passage switching valves 22a and 22b are fully opened, and the temperature of the exhaust gas is raised. If the temperatures of the filters 20 is in the temperature range in which the HC can be purified, the fuel is supplied from the reducing agent injection valves 28a and 28b by adjusting the supply amount such that the air-fuel ration of the exhaust gas becomes slightly lean.

Since the basic hardware structure is the same as in the first embodiment, the description thereof will be omitted.

Next, the filter heating control according to the third embodiment will be described.

FIG. 6 is a flow chart showing a flow of the filter heating control according to the third embodiment.

In step S301, the flow passage switching valves 22a and 22b are fully opened. Thus, the exhaust gas is allowed to flow in both the filters 20a and 20b, so that they are heated at the same time. The flow passage switching valves 22a and 22b may be slightly closed.

In step S302, the temperature of the exhaust gas discharged from the engine 1 is raised. The same operation as in step S102 in FIG. 4 in the first embodiment is performed.

In step S303, it is determined whether the temperatures of the filters 20a and 20b are in a temperature range in which the HC can be sufficiently purified. The CPU 351 reads the output signals from the filter temperature sensors 24a and 24b and determines the temperatures of the filters 20.

If an affirmative determination is made in step S303, the process proceeds to step S304. If a negative determination is made in step S303, the process returns to step S302.

In step S304, the heating control for the filters 20 is performed by injecting the fuel from the reducing agent injection valves 28. The air-fuel ratio is made slightly lean by adjusting the fuel supply amount.

Specifically, the CPU 351 reads the engine rotation number, the output signal (accelerator pedal opening) of the accelerator pedal opening sensor 36, the output signal value (intake air amount) of an air flow meter (not shown), the output signal of the air-fuel sensor, the fuel injection amount, and the like, which are memorized in the RAM 353.

The CPU 351 accesses the reducing agent supply amount control map in the ROM 352 using the engine rotation number, the accelerator pedal opening, the intake air amount, and the fuel injection amount as parameters, and calculates the supply amount of the reducing agent (target supply amount) required for making the air-fuel ratio of the exhaust gas equal to a target air-fuel ratio which has been previously set.

Next, the CPU 351 accesses a reducing agent injection valve control map in the ROM 352 using the target supply amount as a parameter, and calculates a valve opening time period (target valve opening time period) of the reducing agent injection valves 28 required for injecting the target supply amount of the reducing agent from the reducing agent injection valves 28.

When the target valve opening time period of the reducing agent injection valves 28 is calculated, the CPU 351 opens the reducing agent injection valves 28.

Then, when the target valve opening time period has passed after the reducing agent injection valves 28 are opened, the CPU 351 closes the reducing agent injection valves 28.

When the reducing agent injection valves 28 are opened for the target valve opening time period, the target supply amount of the fuel is injected into the first exhaust pipe 19a and the second exhaust pipe 19b from the reducing agent injection valves 28. The reducing agent injected from the reducing agent injection valves 28 is mixed with the exhaust gas flowing from the upstream of the first exhaust pipe 19a and the second exhaust pipe 19b to produce the air-fuel mixture at the target air-fuel ratio. Then, the exhaust gas flows into the filters 20.

As a result, the air-fuel ratio of the exhaust gas flowing into the filters 20 can be made slightly lean. The pressure of the fuel injected from the reducing agent injection valves 28 may be decreased by a regulator (not shown) so as to decrease the fuel amount for injection. Also, the injection time period per each injection may be shortened so as to decrease the fuel amount for injection.

In step S305, it is determined whether the temperatures of the filters 20 are in a temperature range in which the NOx can be sufficiently purified. The CPU 351 reads the output signals from the filter temperature sensors 24a and 24b, and determines the temperatures of the filters 20.

If an affirmative determination is made in step S305, the filter heating control is finished. If a negative determination is made in step S305, the process returns to step S304.

Thus, in the third embodiment, the temperatures of the filters 20 can be raised promptly by allowing the exhaust gas to flow in both the filters 20 and making the air-fuel ratio of the exhaust gas slightly lean.

In the third embodiment, the target temperature of the filters 20 is set to a temperature at which the NOx can be purified. However, instead, the target temperature may be set to a temperature at which the PM can be oxidized. By this setting, the PM can be removed without being accumulated in the filters 20.

What is claimed is:

1. An exhaust gas purifying apparatus for an internal combustion engine, comprising:

plural exhaust passages of the internal combustion engine which are provided in parallel, and which include a first exhaust passage and a second exhaust passage;

a first catalyst which is provided in the first exhaust passage and has an oxidation function;

a second catalyst which is provided in the second passage and has an oxidation function;

a reducing agent supply device that supplies a reducing agent to at least one of the first catalyst and the second catalyst;

a catalyst heating device that raises a temperature of at least one of the first catalyst and the second catalyst independently of the reducing agent supply device;

a flow amount adjusting device that adjusts amounts of an exhaust gas flowing in the first exhaust passage and the second exhaust passage respectively;

a temperature estimating device that estimates temperatures of the first catalyst and the second catalyst; and a control system which controls the flow amount adjusting device to adjust the exhaust gas such that a larger amount of the exhaust gas flows in the first exhaust passage than in the second exhaust passage, and controls the catalyst heating device to raise a temperature of the first catalyst when the temperatures of the first catalyst and the second catalyst are lower than a temperature range in which the reducing agent can be purified, and controls the reducing agent supply device to supply the reducing agent to the first catalyst so as to raise the temperature of the first catalyst when the temperatures of the first catalyst and the second catalyst are in the temperature range in which the reducing agent can be purified, in a case where temperatures of the first catalyst and the second catalyst estimated by the temperature estimating device need to be raised.

2. The exhaust gas purifying apparatus for an internal combustion engine according to claim 1, wherein the control device cuts off a flow of the exhaust gas into the second exhaust passage and allows a flow of the exhaust gas into the first exhaust passage by the flow amount adjusting device in a case where the temperatures of the first catalyst and the second catalyst need to be raised.

3. The exhaust gas purifying apparatus for an internal combustion engine according to claim 1, wherein the control device cuts off a flow of the exhaust gas into the first exhaust passage and allows a flow of the exhaust gas into the second exhaust passage by the flow amount adjusting device after warm-up of the internal combustion engine is completed, and raises a temperature of the second catalyst by the catalyst heating device when the temperature of the second catalyst is lower than the temperature range in which the reducing agent can be purified, and supplies the reducing agent to the second catalyst by the reducing agent supply device so as to raise the temperature of the second catalyst when the temperature of the second catalyst is in the temperature range in which the reducing agent can be purified.

4. The exhaust gas purifying apparatus for an internal combustion engine according to claim 1, wherein the control device allows the exhaust gas to flow in at least one of the plural catalysts other than the first catalyst when the temperature of the first catalyst has been raised to a temperature range in which nitrogen oxides can be purified.

5. The exhaust gas purifying apparatus for an internal combustion engine according to claim 1, wherein the first catalyst and the second catalyst are supported on a particulate filter which can temporarily trap a particulate matter in the exhaust gas and the exhaust gas is allowed to flow in at least one of the plural catalysts other than the first catalyst when the temperature of the first catalyst has been raised to a temperature range in which the particulate matter in the exhaust gas can be removed.

6. The exhaust gas purifying apparatus for an internal combustion engine according to claim 1, further comprising:

an exhaust gas pressure detecting device that detects a pressure of the exhaust gas upstream of the first catalyst and the second catalyst, wherein the flow amount adjusting device increases the amount of the exhaust gas flowing in the second catalyst when the pressure detected by the exhaust gas pressure detecting device is equal to or higher than a predetermined value.

7. The exhaust gas purifying apparatus for an internal combustion engine according to claim 1, wherein the catalyst heating device raises the temperature of the exhaust gas flowing in the first catalyst and the second catalyst by controlling at least any one of injection timing and an injection amount of a fuel injected to the internal combustion engine.

8. The exhaust gas purifying apparatus for an internal combustion engine according to claim 1, wherein:

the catalyst heating device includes a circulation passage which extends from the exhaust passage of the internal combustion engine to an intake passage of the internal combustion engine, and allows a part of the exhaust gas in the exhaust passage to circulate in the intake passage, the catalyst heating device raises the temperature of the exhaust gas flowing into the first catalyst by increasing an amount of the exhaust gas which is circulated in the intake passage through the circulation passage.

9. An exhaust gas purifying apparatus for an internal combustion engine, comprising:

a NOx catalyst which are provided in an exhaust passage of the internal combustion engine, and which purify nitrogen oxides in the exhaust gas;

a reducing agent supply device that supplies a reducing agent to the NOx catalyst;

a catalyst heating device that raises temperature of the NOx catalyst independently of the reducing agent supply device;

a flow amount adjusting device that adjusts an amount of the exhaust gas flowing in the exhaust passage;

a temperature estimating device that estimates the temperature of the NOx catalyst; and a control device which controls the flow amount adjusting device to allow a larger amount of the exhaust gas to flow in the NOx catalyst than when the NOx is purified in the NOx catalyst and controls the NOx catalyst heating device to raise the temperature of the NOx catalyst when the temperature of the NOx catalyst are lower than a temperature range in which the reducing agent can be purified, and controls the reducing agent supply device to supply the reducing agent to the NOx catalyst so that an air-fuel ratio of the exhaust gas becomes larger than a stoichiometric air-fuel ratio, thereby raising the temperature of the NOx catalyst, when the temperature of the NOx catalyst are in the temperature range in which the reducing agent can be purified.

10. A method for purifying an exhaust gas of an internal combustion engine including plural exhaust passages of the internal combustion engine which are provided in parallel, and which includes a first exhaust passage and a second exhaust passage, a first catalyst and a second catalyst which are provided in the first exhaust passage and the second exhaust passage, respectively, and have an oxidation function, comprising:

adjusting a flow amount of the exhaust gas so that a larger amount of the exhaust gas flows in the first exhaust passage than in the second exhaust passage; and raising a temperature of the first catalyst when temperatures of the first catalyst and the second catalyst are lower than a temperature range in which a reducing agent can be purified, and supplying the reducing agent to the first catalyst so as to raise the temperature of the first catalyst when the temperatures of the first catalyst and the second catalyst are in the temperature range in which the reducing agent can be purified, in a case where the temperatures of the first catalyst and the second catalyst need to be raised.

11. The method for purifying an exhaust gas of an internal combustion engine according to claim 10, wherein in a case where the temperatures of the first catalyst and the second catalyst need to be raised, a flow of the exhaust gas in the second exhaust passage is cut off and a flow of the exhaust gas in the first exhaust passage is allowed.

12. The method for purifying an exhaust gas of an internal combustion engine according to claim 11, further comprising:

cutting off a flow of the exhaust gas in the first exhaust passage and allowing a flow of the exhaust gas in the second exhaust passage after warm-up of the internal combustion engine is completed; and raising the temperature of the second catalyst when the temperature of the second catalyst is lower than the temperature range in which the reducing agent can be purified, end supplying the reducing agent to the second catalyst so as to raise the temperature of the second catalyst when the temperature of the second catalyst is in the temperature range in which the reducing agent can be purified.

* * * * *